Figure 1:
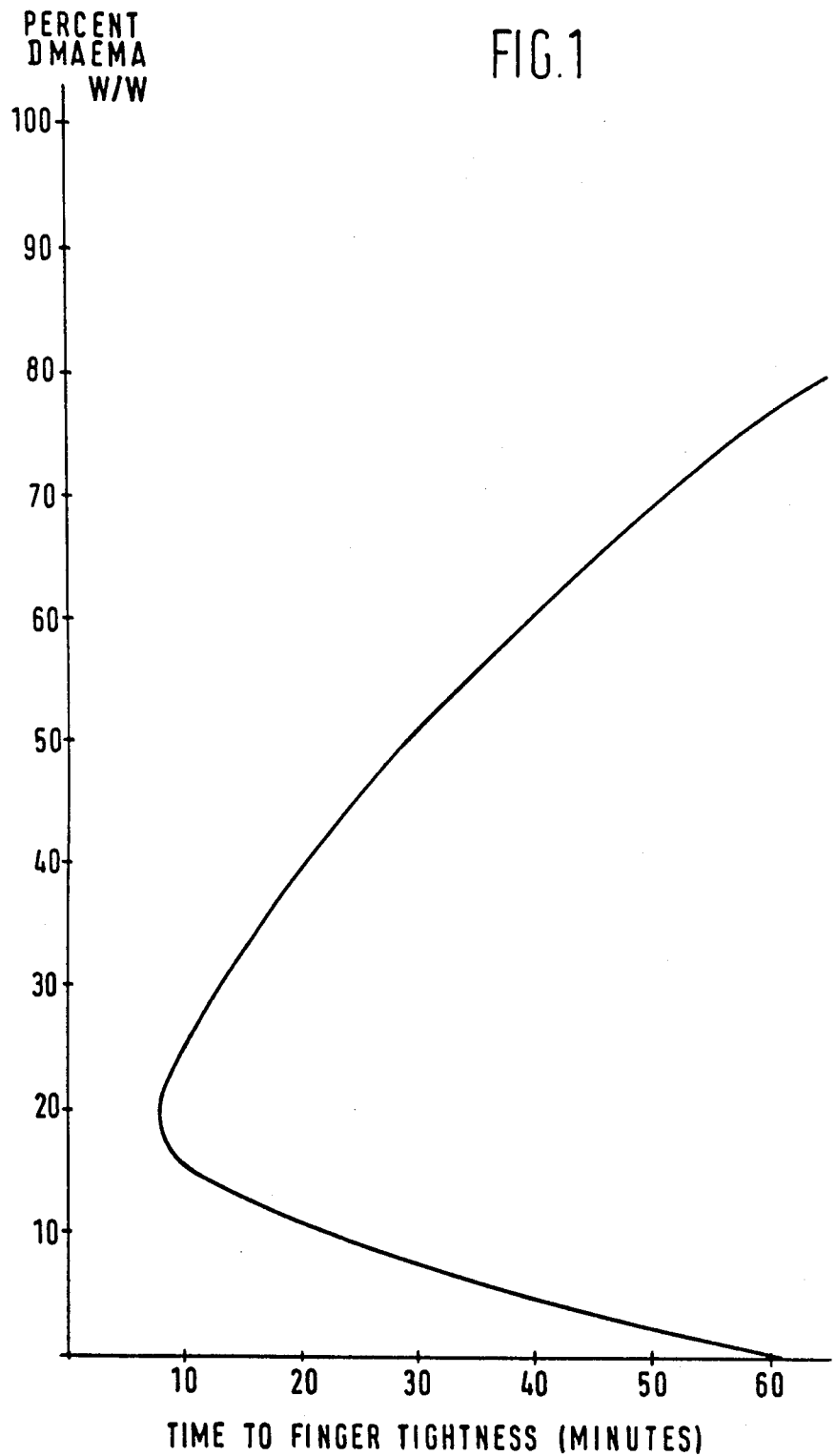

United States Patent [19]
Bradley et al.

[11] 3,944,521
[45] Mar. 16, 1976

[54] ANAEROBIC ADHESIVES CONSISTING OF POLYALKOXY DIACRYLATE ESTER OF BISPHENOL A MONOMER AND DIMETHYLAMINOETHYL METHACRYLATE MONOMER USING HYDROPEROXIDE AS CATALYST

[75] Inventors: Geoffrey Bradley, Leeds; Keith Hargreaves, Huby; Paul Wainwright, Leeds, all of England

[73] Assignee: Rocol Limited, Leeds, England

[22] Filed: Oct. 24, 1974

[21] Appl. No.: 517,645

[30] Foreign Application Priority Data
Oct. 30, 1973 United Kingdom............... 50364/73

[52] U.S. Cl......... 260/47 UA; 156/331; 260/80.3 N
[51] Int. Cl.².......................................... C09J 3/14
[58] Field of Search......... 260/47 UA, 89.5, 80.3 N; 156/331

[56] References Cited
UNITED STATES PATENTS

| | | | |
|---|---|---|---|
| 3,043,820 | 7/1962 | Krieble | 260/89.5 |
| 3,369,058 | 2/1968 | Keenan | 260/62 |
| 3,435,012 | 3/1969 | Nordlander | 260/88.3 |
| 3,682,875 | 8/1972 | O'Sullivan et al. | 260/89.5 R |
| 3,773,702 | 11/1973 | Oboshi | 156/331 |
| 3,890,273 | 6/1975 | Saito | 260/47 UA |

FOREIGN PATENTS OR APPLICATIONS
4,515,640  1/1970  Japan............................ 260/47 UA

*Primary Examiner*—Joseph L. Schofer
*Assistant Examiner*—Peter F. Kulkosky
*Attorney, Agent, or Firm*—Larson, Taylor and Hinds

[57] ABSTRACT

Anaerobically curable compositions comprising a polyalkoxy diacrylate ester monomer in which the alcohol moiety contains an aromatic group, and a latent initiator for polymerisation, and comprising further an amino alcohol acrylate ester reactable with the monomer.

9 Claims, 2 Drawing Figures

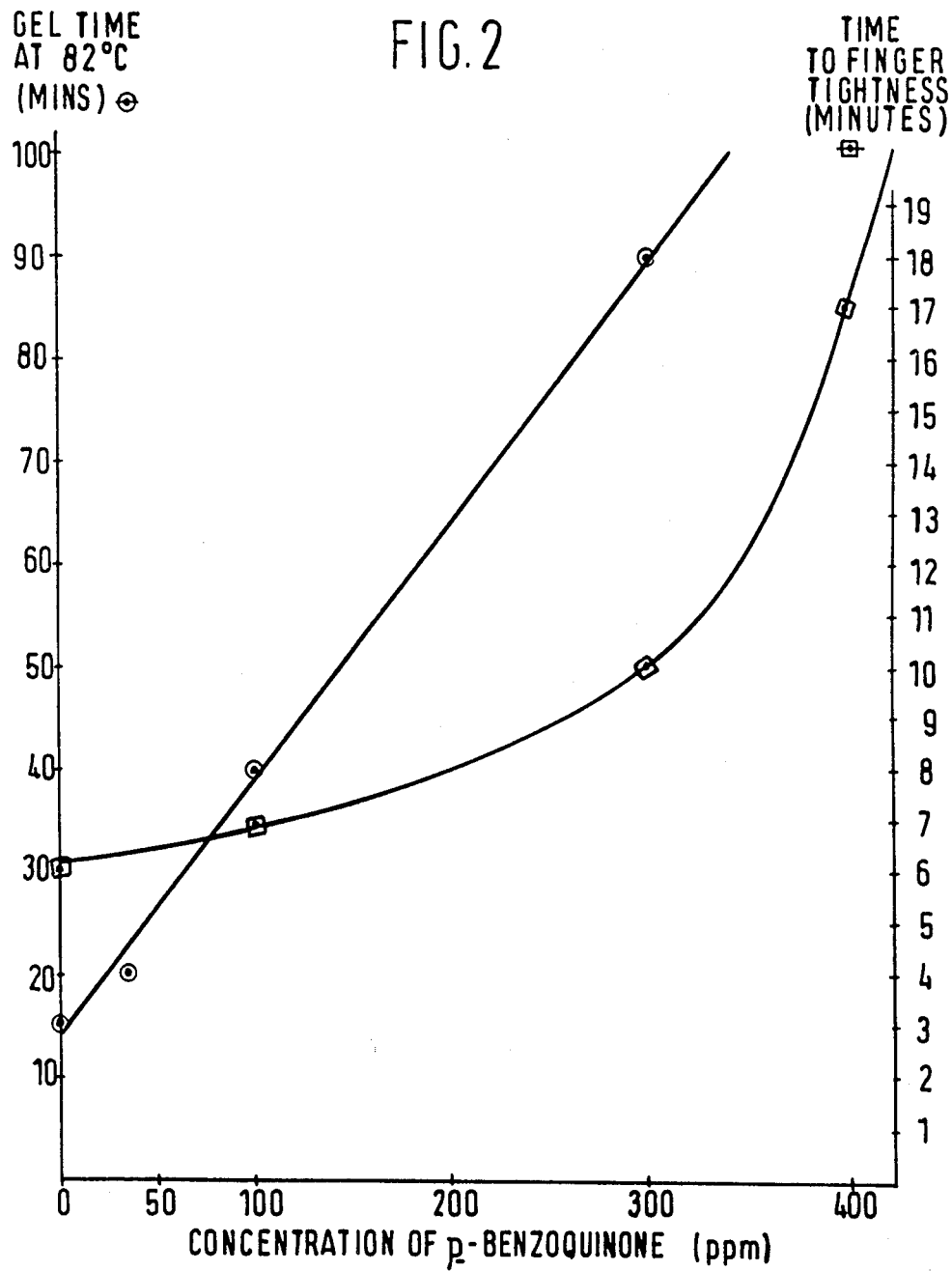

ANAEROBIC ADHESIVES CONSISTING OF POLYALKOXY DIACRYLATE ESTER OF BISPHENOL A MONOMER AND DIMETHYLAMINOETHYL METHACRYLATE MONOMER USING HYDROPEROXIDE AS CATALYST

The invention relates to anaerobic adhesives.

Such adhesives contain, as is well known, a monomer capable of polymerisation when excluded from air between metal or other surfaces, a latent initiator for the polymerisation, and, optionally, additives such as accelerators for the polymerisation and inhibitors of premature polymerisation while the composition remains exposed to air.

The monomers of the anaerobic adhesives of the invention are those of our U.K. Patent Application No. 60628/71 (U.S. S/N 341 740 George et al.; German Offenlegungsschrift 2 202 040) herein referred to as our earlier patent application, which are of the following formula:

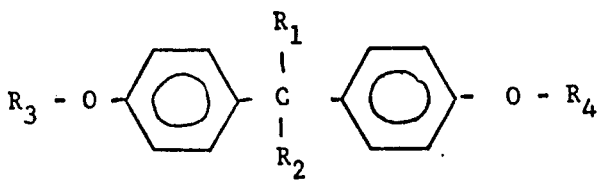

where:
the aromatic groups are benzene rings or other aromatic groups substituted or not;
$R_1$ and $R_2$ represent hydrogen, alkyl, aryl or hydroxyalkyl groups, or halogen; and
$R_3$ and $R_4$ represent

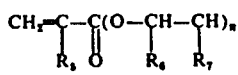

where
$n$ is an integer, for example 1 to 20 and preferably 1 to 5, and $R_5$, $R_6$ and $R_7$ represent hydrogen, alkyl or alkoxy groups, or halogen.

Examples of aromatic groups other than benzene are naphthalene, anthracene and other polynuclear groups. The alkyl groups may be methyl, ethyl and other primary, secondary or tertiary alkyl groups and the hydroxyalkyl groups for example, hydroxyethyl. The preferred halogen is chlorine.

In particular the esters may be esters of alkoxylated derivatives of bisphenol A:

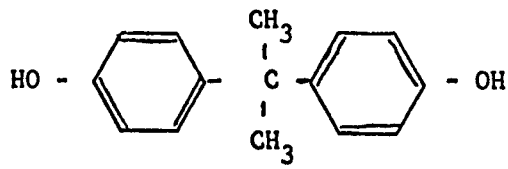

or bisphenol C:

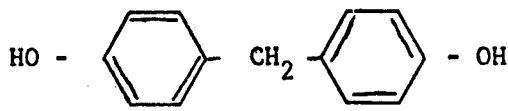

or similar compounds with substituents in the benzene rings, with substituents other than methyl groups on the central carbon atom, or with other aromatic groups, substituted or not, in place of the benzene rings.

A preferred monomer is the dimethacrylate of propoxylated bisphenol A, the number of propoxyl residues in the chain being preferably 1 to 5; others are propoxylated bisphenol C dimethacrylate, ethoxylated bisphenol A dimethacrylate, and ethoxylated bisphenol A di-acrylate.

The present invention is to incorporate, in anaerobic adhesives containing the above monomers and a latent initiator, amino acrylate esters such for example as dimethylaminoethyl methacrylate:

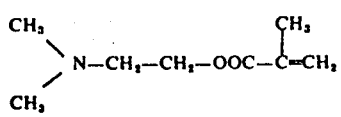

By the use of amino acrylate esters, for example in the range 5–60% and preferably 15–25% by weight of the composition, anaerobic adhesives can be produced having short curing times on a wide variety of metal surfaces.

Further it is found unexpectedly that by the use of quinones such as 1,4-benzoquinone as inhibitors, for example in the range 5–500 ppm, a high degree of control over the setting time and stability can be achieved, with high final strength.

Other suitable quinones are acenaphthene quinone and 9,10-anthraquinone but the invention is not limited to these.

The latent initiator or catalyst for polymerisation of the monomers is preferably p-menthane hydroperoxide but a wide range of other hydroperoxides is suitable, including for example di-isopropyl benzene hydroperoxide and cumene hydroperoxide. The hydroperoxides may be used in admixture with peroxides particularly dialkyl peroxides such as di-tertiarybutyl peroxide. The amounts of initiator are in themselves conventional, for example 0.5 to 10.0% by weight of the composition.

Preferably the compositions contain also an amine, preferably a primary amine, as an accelerator for the polymerisation. The use of 2-aminopyridine gives particularly good results. Other suitable amines are 4-aminopyridine, 3-aminoquinoline, the N,N-dimethyl derivatives of aniline, 4-nitro-aniline, toluidine and 1-naphthylamine, and N,N-diethyl aniline. A wide range of other nitrogen or sulphur containing compounds can however be used as accelerators, including 2,4-dinitrophenol, dodecane-1-thiol, N,N-dimethyl coco amine N-oxide, alpha picoline N-oxide and tris methyl aziridine oxide. Again, the amounts added are in themselves conventional, for example 0.1 to 5.0% by weight of the composition.

It is however possible to omit a separate accelerator as the amino-acrylate esters, being nitrogen compounds, have accelerating properties themselves.

The following examples illustrate the invention, giving specific formulations. Any of the numerous formulations set out in our earlier patent application may however be modified by addition of aminoalkylacrylates and particularly dimethylaminoethylmethacrylate in the amounts set out above, for example 10 or 15% b weight in place of an equal amount of the diacrylate ester monomer in each case.

In the examples reference is made to the accompanying drawings, in which:

FIG. 1 shows the effect of dimethylaminoethyl methacrylate on cure time of the formulations given below. The optimum level is found to be in the range 15–25% dimethylaminoethyl methacrylate at a constant inhibitor level of 300 ppm p-benzoquinone. The tests are on 5/16 inch BSF high tensile steel nuts and bolts in both the figures.

FIG. 2 shows the effect of inhibitor on the cure time and stability of the anaerobic adhesive product. The results show that the important stability range of 50–70 minutes at 82°C can be covered without significant effect of the inhibitor on setting times to finger tightness. The change in these times is small over the wide range 100 to 300 ppm.

The formulations used are as follows:

x parts commercial dimethylaminoethyl methacrylate — values of up to 80 (FIG. 1) and of 15 (FIG. 2)

1.5 parts 2-amino pyridine 3.5 parts mixed peroxides (9:1 p-menthane hydroperoxide:di-t-butyl peroxide)

(95-x) parts dimethacrylate ester of ethoxylated bisphenol A 300 ppm p-benzoquinone inhibitor based on the whole formulation or (FIG. 2) amounts as shown The structural formula of the dimethacrylate ester is:

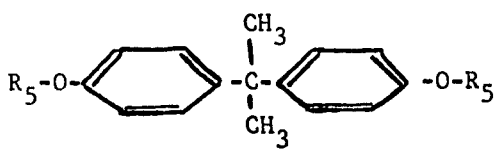

where
R$_5$ is:

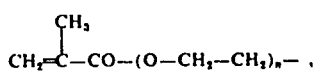

n being average ca.1

Table I below shows the effect of dimethylaminoethyl acrylate on cure time and strength of such formulations on a wide variety of metal surfaces.

TABLE I

| | Time to finger tightness (minutes) | | | Break loose torque (in/lbs) after | | |
|---|---|---|---|---|---|---|
| | | | | 3 days | 1 day | 1 day |
| Dimethylamino-ethyl methacrylate | 0% | 5% | 15% | 0% | 5% | 15% |
| Type of metal a) 5/16" fasteners:* | | | | | | |
| H.T. Steel | 60 | 30 | 10 | 170 | 175 | Over 200 |
| Brass | 10 | 2 | 2 | 40 | 100 | 70 |
| Zinc | 10 | 45 | 15 | 70 | 75 | 120 |
| Chromium | 300 | 40 | 6 | 90 | 110 | 160 |
| Nickel | 50 | 30 | 5 | 90 | 130 | 130 |
| Passivated Stainless steel | (Over 7 days) | (Over 2 days) | 90 | nil | nil | 75 |
| Stainless steel | (8 hrs.) | 20 | 6 | 40 | 110 | 110 |
| Cadmium | 45 | 30 | 15 | 120 | 100 | 100 |
| b) Bush & Pin:** | | | | | | |

TABLE I-continued

| | Time to finger tightness (minutes) | | | Break loose torque (in/lbs) after | | |
|---|---|---|---|---|---|---|
| | | | | 3 days | 1 day | 1 day |
| Dimethylamino-ethyl methacrylate | 0% | 5% | 15% | 0% | 5% | 15% |
| H.T. Steel | 45 | 15 | 3 | 1700 | 1700 | 1850 |

*B.S.F. nuts & bolts
**Pin 1" by 0.5" diameter. Bush 1" outside diameter 0.5" deep, 0.5" diameter bore.

This table clearly shows the advantageously wide range of surfaces suitable for bonding and the short setting times achieved. Further, the formulation is stable over a long period both as a formulation and in respect of the strength of the final bond, which is itself high.

It is believed that the desirable properties of the adhesives of the present invention are due to co-reaction of the aminoacrylates with the ester monomers during polymerisation, and that the strength shown is due at least in part to strong adsorption of aminoacrylate residues at the metal surface. It is the strength of adhesion to the bonded surfaces that is normally the limiting factor in the bond strength rather than the shear strength of the adhesive itself, and the nitrogen atom is believed to play an important part in the adhesion. If one uses for example 15% of 2-hydroxyethylmethacrylate, a commercially available material regarded for many purposes as comparable to dimethylaminoethylmethacrylate, the desirable results obtainable with the latter are not shown. The final break-loose torque is reduced, and further the finger-tight setting time is comparable to that of unmodified compositions containing only the diacrylate esters monomers.

What we claim is:

1. Anaerobically curable compositions comprising a diacrylate ester monomer and hydroperoxide as a latent initiator of polymerization in an amount sufficient to initiate polymerization of said monomer, the monomer being of the general formula:

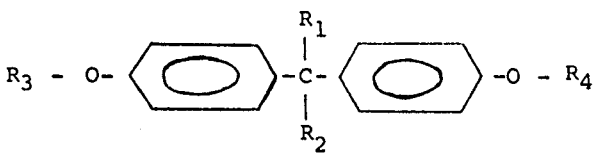

where:
the aromatic groups are benzene rings or other aromatic groups substituted or not;
R$_1$ and R$_2$ represent hydrogen, alkyl, aryl or hydroxyalkyl groups, or halogen; and
R$_3$ and R$_4$ represent

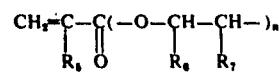

where n is an integer from 1 to 20 and particularly 1 to 5, and R$_5$, R$_6$ and R$_7$ represent hydrogen, alkyl or alkoxy groups, or halogen, said compositions further comprising 5–60% by weight of the composition of dimethylaminoethylmethacrylate.

2. Compositions according to claim 1, in which the diacrylate ester is an ester of an alkoxylated derivative of bisphenol A:

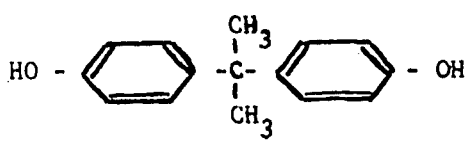

or bisphenol C:

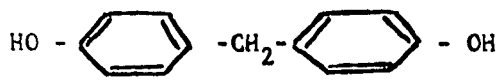

3. Compositions according to claim 1, in which the dimethylamino ethylmethacrylate forms 15–25% by weight of the composition.

4. Compositions according to claim 1, in which the hydroperoxide is p-menthane hydroperoxide.

5. Compositions according to claim 1, comprising also a quinone inhibitor against premature polymerisation in the presence of air.

6. Compositions according to claim 5, in which the quinone is 1,4-benzoquinone.

7. Compositions according to claim 6, in which the amount of the quinone is 5–500 ppm based on the composition.

8. Compositions according to claim 1, comprising also an amine as an accelerator of the polymerisation reaction under anaerobic conditions.

9. Compositions according to claim 8, in which the amine is 2-amino pyridine.

* * * * *